United States Patent [19]

Brachet et al.

[11] Patent Number: 4,519,978
[45] Date of Patent: May 28, 1985

[54] SECONDARY HEAT TRANSFER CIRCUIT FOR A NUCLEAR REACTOR

[75] Inventors: Alain Brachet, Orsay; Jacques Figuet, Aix en Provence; Joël Guidez, Connaux; Noël Lions, Manosque, all of France

[73] Assignee: Commissariat a l'Energie Atomique, Paris, France

[21] Appl. No.: 534,280

[22] Filed: Sep. 21, 1983

[30] Foreign Application Priority Data

Sep. 22, 1982 [FR] France .................. 82 15958

[51] Int. Cl.³ .................. G21C 15/00; G21D 1/00
[52] U.S. Cl. .................. 376/307; 376/402; 376/404; 165/104.32
[58] Field of Search ......... 165/104.31, 104.32; 376/307, 402, 403, 404, 405

[56] References Cited

FOREIGN PATENT DOCUMENTS 0014662 8/1980 European Pat. Off. .
1518393 3/1968 France .
2379881 9/1978 France .

OTHER PUBLICATIONS

Energie Nucleaire, vol. 12, No. 1, Jan.–Feb. 1970, E. V. Borisiouk et al., "Le reacteur experimental rapide Bor", pp. 33–38, p. 35; passage Deuxieme circuit; FIG. 3.
Nuclear Engineering International, vol. 20, No. 231, Jun.–Jul. 1975, S. Rippon, "BN 600 Status Report", pp. 551–555; passage Steam generator, p. 553; FIG. 9.
Kerntechnik, vol. 7, No. 10, Oct. 1965, H. Hubel et al., "Sicherheitsaspekte beim 20-MW-Versuchskraftwerk KNK", pp. 433–441, FIG. 2.

Primary Examiner—Harvey E. Behrend
Assistant Examiner—Richard W. Wendtland

[57] ABSTRACT

The invention relates to a secondary heat transfer circuit for a liquid metal nuclear reactor.

Each loop of the main circuit has in order a steam generator, a pump, and at least one heat exchanger positioned in the reactor vessel. A downstream buffer tank is located in the pipe connecting the generator to the pump, whilst the upstream buffer tank can be positioned either in the generator, or outside the latter.

Application to the generation of electric power by means of a fast neutron reactor.

7 Claims, 3 Drawing Figures

SECONDARY HEAT TRANSFER CIRCUIT FOR A NUCLEAR REACTOR

BACKGROUND OF THE INVENTION

The present invention relates to a secondary heat transfer circuit for a nuclear reactor cooled by a liquid metal, such as sodium.

In the present state of the art, fast neutron nuclear power stations conventionally comprise a primary circuit in which the sodium extracts the heat produced by the fuel elements of the core, in order to transfer it to a heat exchanger, in which it transfers its heat to sodium contained in a secondary heat transfer circuit. The hot sodium leaving the exchanger in said secondary circuit transfers the heat to a steam generator, where it gives up its heat to the pressurized water contained in a tertiary heat transfer circuit supplying steam to a turbine in order to produce electricity.

According to a so-called integrated reactor design, the primary heat transfer circuit is completely integrated into a vessel containing both the core of the reactor, the exchangers and the circulating pumps of the primary circuit, together with the liquid sodium contained in said circuit. As there are three or four heat exchangers the secondary heat transfer circuit outside the reactor vessel is usually divided into three or four identical loops, which also applies with respect to the tertiary heat transfer circuit.

In existing fast neutron nuclear power stations, the existence of a secondary heat transfer circuit is justified by the need of very safely confining the radioactive primary sodium and because it is necessary to protect the primary circuit from the possible repercussions of a leak from the heat exchange surface of the steam generator. Thus, in such a case, the pressurized steam or water would come into contact with the sodium and the chemical reaction produced is highly exothermic, releasing dangerous and corrosive reaction products (caustic soda and hydrogen). It is therefore necessary to protect the core, i.e. the primary circuit, from the possible repercussions of this sodium-water reaction (overpressure and pollution by sodium).

FIG. 1 shows the conventional construction of a secondary cooling loop of a fast neutron nuclear reactor. In the embodiment shown in continuous line form, this loop comprises a heat exchanger 4, whilst in the embodiment shown in broken line form, a further heat exchanger. The exchangers 4 are placed in vessel 2, sealed by a slab 3 and containing the reactor core 7 and the complete primary heat transfer circuit. More particularly, vessel 2 is filled with liquid sodium 5. The outlet from each exchanger 4 is connected to a steam generator 6 by an outgoing pipe 8. In the upper part of the steam generator, there is an argon pocket 6a, which defines the free sodium level N. The outlet of steam generator 6 is connected by a pipe 10 to the suction opening of a circulating pump 12, whereof each delivery opening is connected by a pipe 14 to the intake of an exchanger 4.

In such a conventional secondary cooling loop, the passage of the pump shaft is sealed by means of a mechanical packing, which is in contact with a neutral gas such as argon placed between the sodium and the packing. For this purpose, the free sodium level N1 is surmounted by an argon pocket 12a. Moreover, in order that the sodium level N1 cannot inopportunely rise to the packing, the pump rotor is placed in an expansion tank 18, whose size is adequate to absorb, without immersing the packing, all possible increases in the sodium volume in the secondary loop (by thermal expansion). Finally, in order to avoid any risk of the lining being immersed, which might occur in the case of an argon loop surmounting the sodium in tank 18, the latter is placed at the highest point of the circuit.

A pipe 20 for topping up with sodium connects a storage tank 24 placed in the lower part of the installation to the upper part of tank 18. This pipe 20 is equipped with a circulating pump 19 and a sodium purification system 21. It makes it possible to compensate any leak of the drain valve V2, which is positioned in the drain pipe 38 of pipe 10. Conversely, any inopportune rise in the free sodium level N1 of tank 18 is compensated by an overflow pipe 22, which connects tank 18 to pipe 36 below drain valves V1, located in the drain pipes 36 of pipes 8.

The argon pressure in tank 18 is controlled by an inlet tube 23, whilst the free sodium level N2 in tank 24 is surmounted by an argon covering 24a, whose pressure is controlled by a tube 26. Moreover, the argon coverings or pockets 6a, 12a of the generator and the pump communicate by both pipe 25 for balancing levels N and N1 and the pressures.

As is also illustrated in FIG 1, tank 34 is also used for recovering any products resulting from a sodium-water reaction in the case of a leak in the steam generator 6. To this end, a pipe 30 connects the lower part of steam generator 6 to the upper part of tank 24. This pipe is normally sealed by large diameter bursting disks 28, which burst under the effect of overpressures due to the sodium-water reaction and thus permit the decompression of the secondary loop. In this case, tank 24 ensures the separation of the liquid and gaseous products resulting from the sodium-water reaction. However, this function can also be assured by a second separator 32, e.g. of the cyclone type, communicating with tank 24 by a pipe 31 and provided with a stack 34 for discharging to the atmosphere the gaseous products (hydrogen, argon, steam).

In addition to the means making it possible to recover the products of the sodium-water reaction which could take place in the steam generator, means are provided for damping shocks in the secondary circuit upstream and downstream of the steam generator, in order that they are not transmitted to the heat exchangers 4. Upstream of the exchange zone of generator 6, said means are constituted by the argon pocket 6a formed within the generator and in the upper part thereof. This argon pocket 6a then fulfils the function of an upstream buffer tank. Downstream of the generator, the downstream buffer tank coincides with the expansion tank 18 of the pump having the argon covering 12a. The prior art secondary loop described hereinbefore has a number of disadvantages mainly resulting from the need of placing the pump in the upper part of the installation and of positioning the pump rotor in a large-size expansion tank 18.

The raised position of the pump places it under poor hydraulic suction conditions, which make it necessary to adopt a low rotation speed and consequently a large diameter wheel and a slow drive motor to avoid cavitation. The assembly has large dimensions and is costly, because as is known the price of a pump increases with the square of its diameter. Parallel to this, the expansion tank surrounding the pump is heavy and expensive.

Moreover, the combination of the weight of the pump-tank assembly and its arrangement in the upper part of the installation involves the use of a large support structure, particularly to obviate possible seismic effects, which tend to increase on increasing elevation. Moreover, bearing in mind the location of the different elements of the loop and the need to be able to empty these by gravity, the piping equipping the installation is particularly long and cumbersome. Finally, the arrangement of the expansion tank is such that it forms a system of vessels communicating with the steam generator. In the case of a sodium-water reaction in the latter, there are then large amplitude oscillations, which the expansion tank finds it difficult to contain.

In order to obviate these disadvantages, European Patent Application 0.014,662 proposes eliminating the expansion tank surrounding the pump and placing the latter in the lower part of the installation, just above the storage tank. This solution is made possible by introducing the storage tank into the active part of the secondary loop and by making it simultaneously serve as a downstream anti-water hammer tank and as an expansion tank. However, it makes it necessary to balance the sodium pressure throughout the secondary loop by placing under an adequate pressure the argon covering over the sodium in the storage tank. In practice, this pressure must be approximately 3 bars relative.

This known solution has the advantage of placing the pump under satisfactory hydraulic operating conditions, but the use of a pressurized storage tank, equipped with immersing pipes causes a significant increase in the risks resulting from the use of sodium as the cooling fluid. In particular, in the case of a leak in the circuit, the leakage flows are significantly increased and with them the risks of ignition of the atomized sodium. Among the other disadvantages of such a solution, reference is made to the impossibility of insulating the storage tank from the remainder of the circuit and the existence of transient phenomena of a difficult nature as a result of the reversal of the leakage flow direction in the pump. Moreover, it is certain that the multiplication of the functions fulfilled by the storage tank makes it particularly difficult to control thermohydraulic phenomena, which occur in said tank and the corresponding thermomechanical loading.

SUMMARY OF THE INVENTION

The present invention relates to a secondary heat transfer circuit not having the disadvantages of the hitherto known heat transfer circuits.

The invention therefore specifically relates to a secondary heat transfer circuit for a liquid metal-cooled nuclear reactor, comprising at least one heat exchanger located in the reactor vessel, a vertical steam generator outside said vessel, an outgoing pipe connecting an outlet tube of each heat exchanger to at least one intake tube of the steam generator, a return pipe connecting at least one outlet tube of the steam generator to an inlet tube of each heat exchanger, a pump for circulating a secondary liquid metal contained in said circuit and positioned in the return pipe, an upstream buffer tank and a downstream buffer tank disposed in said circuit respectively upstream and downstream of the exchange area of the steam generator, and a storage tank for the secondary liquid metal which can be linked with the remainder of the circuit, wherein the downstream buffer tank is disposed in the return pipe between the steam generator and the circulating pump, in the immediate vicinity of the outlet tube of the steam generator, means being provided for establishing a first neutral gas pressure above the free level of the secondary liquid metal contained in the downstream buffer reservoir and means are also provided for simultaneously establishing a second neutral gas pressure above the free level of the secondary liquid metal contained in the storage tank and in the upstream buffer tank, said second pressure being lower than said first pressure.

As a result of these features, the expansion tank can be eliminated and the pump can be positioned in the lower part, without it being necessary to place the circuit under a high argon pressure and without the storage tank being introduced into the actual secondary loop. This leads to a considerable decrease in the overall dimensions and costs of the installation, to an improvement in the protection of the heat exchangers in the case of a sodium-water reaction in the steam generator and to satisfactory operating conditions with respect to the safety standpoint (low pressure), as well as for the operation of the pump.

In a first constructional variant of the invention, the circulating pump is a mechanical axial suction pump having a pump barrel and a motor controlling the rotation of a rotor in the pump barrel via a vertical shaft traversing a hydraulic packing integral with the pump barrel, the secondary liquid metal defining a free level surmounted by a neutral gas covering in that part of the pump barrel above the packing, said neutral gas covering being linked to means for establishing the second neutral gas pressure.

Preferably, the circuit then also comprises means for regulating the level of the secondary liquid metal in the pump barrel, said regulating means incorporating a supply pipe connecting the storage tank to the return pipe upstream of the pump, a discharge pipe connecting an overflow formed in the pump barrel above the hydraulic packing to the storage tank, and means for permanently circulating the secondary liquid metal in said supply and discharge pipes, in order to be able to operate with a permanent secondary liquid metal leak through the hydraulic packing of the pump to the storage tank.

According to a second contructional variant according to the invention, the circulating is an electromagnetic pump.

It should be noted that the position of the downstream buffer tank makes it possible to use the invention with any type of steam generator, i.e. both with a generator completely contained within a single outer envelope and with a generator of the modular type. In the first case, the upper buffer tank is preferably constituted by a neutral gas covering surmounting the secondary liquid metal above the exchange zone, in the upper part of the envelope, whereas when the generator has several exchange modules in parallel, the upstream buffer tank is positioned in the outgoing pipe and is directly linked with the intake tube of each exchange module.

BRIEF DESCRIPTION OF THE DRAWINGS

The invention is described in greater detail hereinafter relative to preferred embodiments and the attached drawings, wherein show.

DETAILED DESCRIPTION OF THE INVENTION

Figure 2:
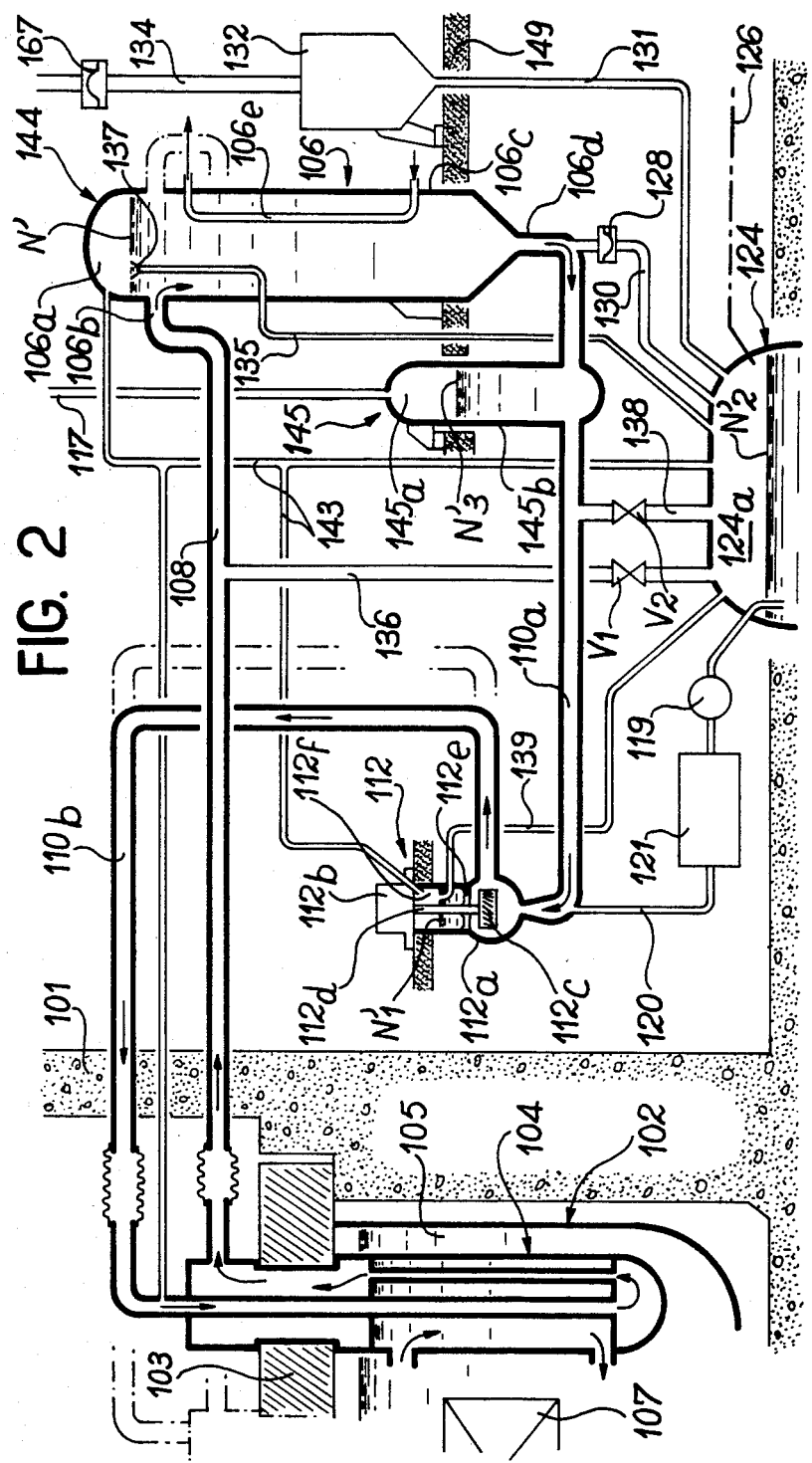
FIG. 2, a view comparable to that of FIG. 1, showing a first embodiment of a loop of a secondary cooling circuit according to the invention.

FIG. 2 shows in simplified form a secondary circuit loop according to the invention. It is more particularly possible to see part of the reactor building 101, on which rests a slab 103 supporting and sealing the reactor vessel 102. Vessel 102 is filled with primary liquid metal 105 and in per se known manner contains the complete primary circuit of the reactor. FIG. 2 more particularly shows within the main vessel 102, the core 107 of the reactor, as well as the heat exchangers 104 used for transmitting the heat extracted from the core by the primary sodium 105 to the sodium circulating in the secondary circuit. In general, the heat exchangers 104 are suspended on slab 103 in such a way that the assembly of the exchange zone is immersed in the primary sodium 105 and only the head of the exchangers is positioned above the slab.

Outside building 101, the secondary loop shown in FIG. 2 essentially comprises in per se known manner a vertical steam generator 106 and a circulating pump 112. The outlet tube of the head of exchanger 104 is connected to the secondary sodium intake tube 106b of steam generator 106 by an out-going pipe 108. In general, the tube 106b for introducing secondary sodium into generator 106, is positioned in the vicinity of the upper dome of the outer envelope 106c of the generator and slightly below the free secondary sodium level N', said level being surmounted by an argon pocket 106a.

In per se known manner, the secondary sodium introduced in this way into the steam generator circulates from top to bottom within envelope 106c up to an outlet tube 106d, located at the lower end of the envelope. During this path, the secondary sodium passes between a large number of vertical tubes such as 106e in which circulates from bottom to top the pressurized water of a not shown water-steam tertiary circuit. The water circulating in the latter circuit is consequently vaporized and drives turbines controlling an electric current generator.

The thus cooled secondary sodium leaves steam generator 106 via tube 106c and returns by a two-part return pipe 110a, 110b to the intake of the head of exchanger 104. More specifically, part 110a of the return pipe links the outlet tube of the steam generator to the suction opening of an axial suction hydraulic pump 112 and the second part 110b of the return pipe links the delivery opening of the pump to an intake of the head of exchanger 104.

Obviously and as shown by broken lines in FIG. 2, several exchangers 104 can be incorporated into the same loop of the secondary circuit. The number of pipes 108, 110b is then multiplied by this number of exchangers.

Still in per se known manner, the secondary circuit also has a storage tank 124, positioned in the lower part of the installation so that it can receive by gravity all the sodium contained in the secondary circuit. Therefore, the low point of pipe 108 is connected to tank 124 by a pipe 136 and the low point of pipe 110a is connected to tank 124 by a pipe 138, each of the pipes 136, 138 being controlled by a valve V1, V2 respectively.

In order to permit the filling of the secondary circuit, when the latter is completely contained in storage tank 124, there is provided a supply pipe 120, whose lower end is immersed into the sodium contained in tank 124 and whose upper end issues into pipe 110a, in the vicinity of the suction opening of pump 112. The sodium circulation in pipe 120 is realised by means of a pump 119, which is generally of the electromagnetic type. Pipe 120 also contains purification means 121, which can e.g. be formed by a random known cold trap.

The sodium contained in storage tank 124 defines a free level N'2, surmounted by a covering 124a of inert gas, such as argon. The pressure of this argon covering is regulated by means of a pipe 126, so as to maintain the argon pressure in tank 124 at a low level, e.g. approximately 0.5 bar relative, no matter what the operating conditions.

In a comparable manner, the sodium contained in the steam generator envelope 106c is surmounted by an argon covering over the actual exchange zone, so as to define a free level N', surmounted by an inert gas covering 106a. This level N' is maintained at a constant value by means of a pipe 135 connecting an overflow 137, disposed within the enclosure 106c of the steam generator, to the upper part of tank 124.

In the embodiment of FIG. 2, pump 112 is a mechanical pump having a pump barrel 112a, a drive motor 112b and a rotor 112c driven by the motor by means of a vertical shaft 112d. Shaft 112d traverses essentially at mid-height of the pump barrel, a hydraulic packing 112e constituted by a labyrinth, permitting a controlled liquid sodium leak from the active part of the pump constituted by the rotor located below packing 112e to the area of barrel 112a positioned above said packing, whilst ensuring a certain insulating between these two areas. Above packing 112e, the liquid sodium defines its free level N'1, surmounted by a neutral gas covering 112f.

Level N'1 is permanently maintained at a substantially constant value both by means of pipe 120 which, through the operation of pump 119, is able to operate with a permanent sodium leak through packing 112e so as to prevent any unwatering of the pump, and by means of a pipe 139, which connects an overflow 141 within the pump barrel to tank 124. Bearing in mind the pressure loss at the packing 112c, there is also a separation between the sodium in the actual second circuit and the sodium in the pump barrel above the packing. This important feature of this embodiment of the invention using a mechanical pump makes it possible to position the latter at any random level and particularly at a relatively low level (close to the lower end of the steam generator), as shown in FIG. 2.

The circuit formed by the supply pipe 120 of pump 119 and the overflow pipe 139, makes it possible to ensure the slow expansion of the sodium, by using the sodium reserve contained in storage tank 124.

The atmospheres of the large volumes constituted by the argon covering 124a of the tank, 106a of the steam generator and 112f of the pump are pressure balanced by means of connecting pipes 143. When the pressure established in the argon covering of storage tank 124 is e.g. 0.5 bar relative, the same applies with respect to the pressure prevailing in the argon coverings of the steam generator and the pump. It should be noted that the low pressure established in this way in the complete secondary circuit according to the invention makes it possible to significantly improve the safety thereof, whilst retaining for pump 112 particularly good hydraulic characteristics resulting from the arrangement thereof at a relatively low point of the installation.

Bearing in mind the overpressure of the expansion tank surrounding the pump in the prior art circuits (FIG. 1) and in order to prevent the transmission to exchangers 104 of pressure waves which could result from a possible sodium-water reaction in steam generator 106, upstream and downstream of the exchange area therof are provided buffer tanks which, according to the invention, are arranged as close as possible to said exchange area, in order not to produce large amplitude oscillations as a result of such shocks.

In known manner, when the steam generator is completely contained in a single envelope 106c, as illustrated in FIG. 2, the upstream buffer tank 144 is constituted by the neutral gas covering 106a enclosed in the dome of generator envelope 106c, above the free sodium of level N'. To this end, the height of the argon covering is calculated in such a way as to absorb the shocks resulting from a sodium-water reaction in the steam generator.

According to the invention, the downstream buffer tank 145 is placed in the return pipe 110a, in the immediate vicinity of the steam generator outlet tube 106d, i.e. substantially at the same level as pump 112 and the lower end of the steam generator. Tank 145 has a vertically axed, cylindrical envelope 145b, pipe 110a issuing at the lower end of said envelope. The sodium contained in tank 145 defines a free level N'3 surmounted by an argon covering 145a, maintained by a regulating pipe 117 at a given pressure level above the pressure level in tank 124, in steam generator 106 and in the pump barrel 112a. Thus, the argon pressure in tank 145 can be approximately 1 bar relative, whereas the argon pressure in the remainder of the circuit is 0.5 bar relative.

Figure 1:
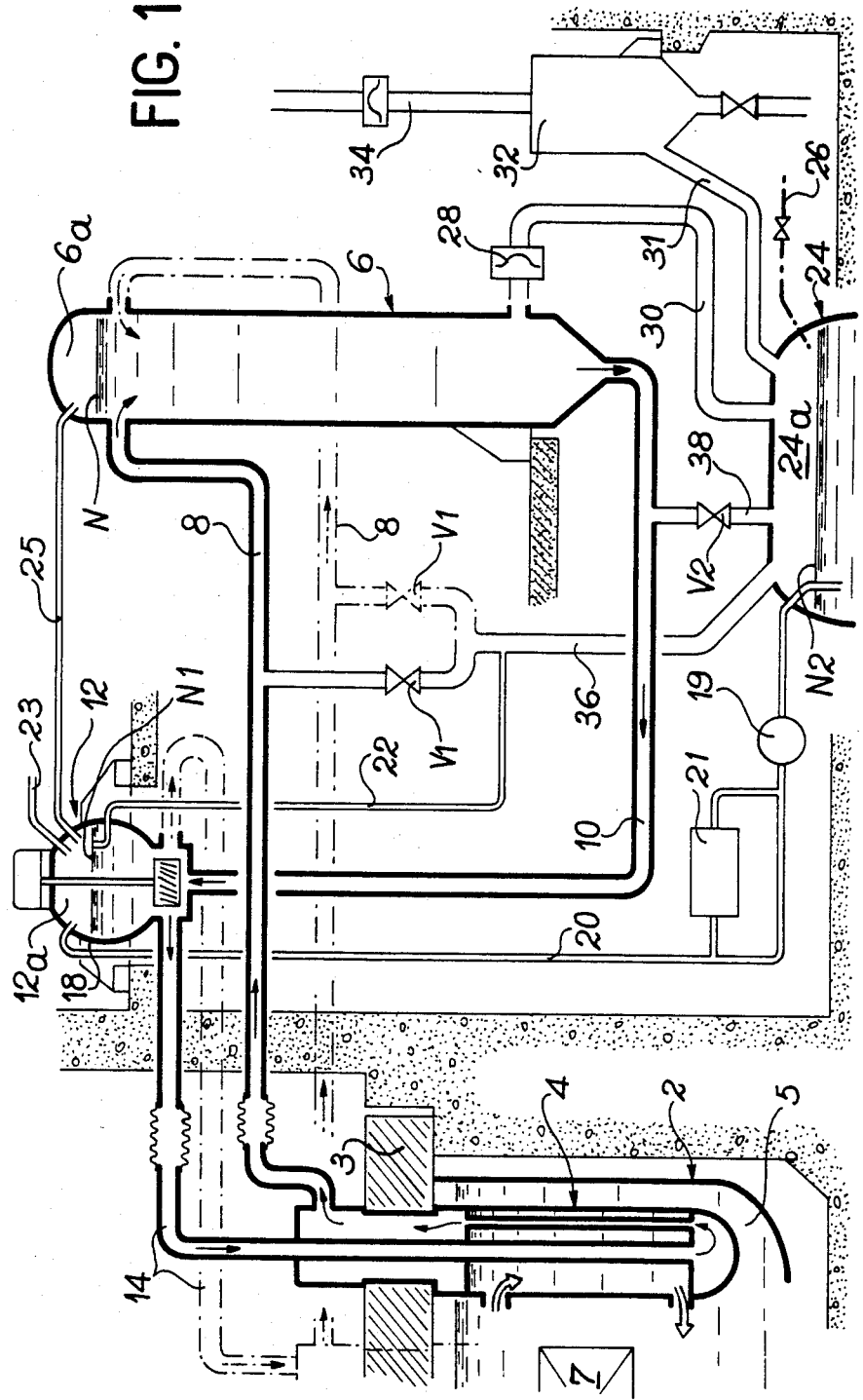
FIG. 1, already described, a loop of a secondary cooling circuit of a fast neutron nuclear power station according to the prior art.

This arrangement of the downstream buffer tank 145 in the immediate vicinity of the outlet of generator 106 makes it possible to obviate, in the case of a sodium-water reaction within the generator, the formation of excessive oscillations in the sodium circuit between the generator outlet and the pump, and also makes it possible to eliminate the expansion tank associated with the pump in the secondary circuit of the known type shown in FIG. 1. As has been shown hereinbefore, the latter feature makes it possible to use a pump of any random type and a relatively reduced volume, whilst more particularly permitting the placing of said pump at any random level of the installation and preferably in a relatively low position.

Over and above the said upstream and downstream buffer tanks, in a conventional manner the products resulting from a possible sodium-water reaction in the steam generator can be evacuated. To this end, a pipe 130 connects the generator outlet tube 106c to the upper part of storage tank 124, which then serves as a separator between the liquid and gaseous products. This pipe 130 is normally sealed by disks or diaphragms 128 having a large cross-section, which burst in the case of an overpressure. In the hypothesis that tank 124 is inadequate to carry out the separation of the liquid and gaseous effluents, the upper part thereof is connected to a separator 132 by a pipe 131. The gaseous effluents leaving separator 132 are discharged into the atmosphere by a stack 134. Conversely, the liquid effluents drop back down again into tank 124. A diaphragm 169 makes it possible to keep stack 134 and separator 132 under a neutral gas.

FIG. 2 shows in exemplified manner the support of pump 112, downstream buffer tank 145, steam generator 106 and separator 132 by gravity on a concrete slab 149. Obviously, this construction is not limitative and any other supporting method can be used.

Figure 3:
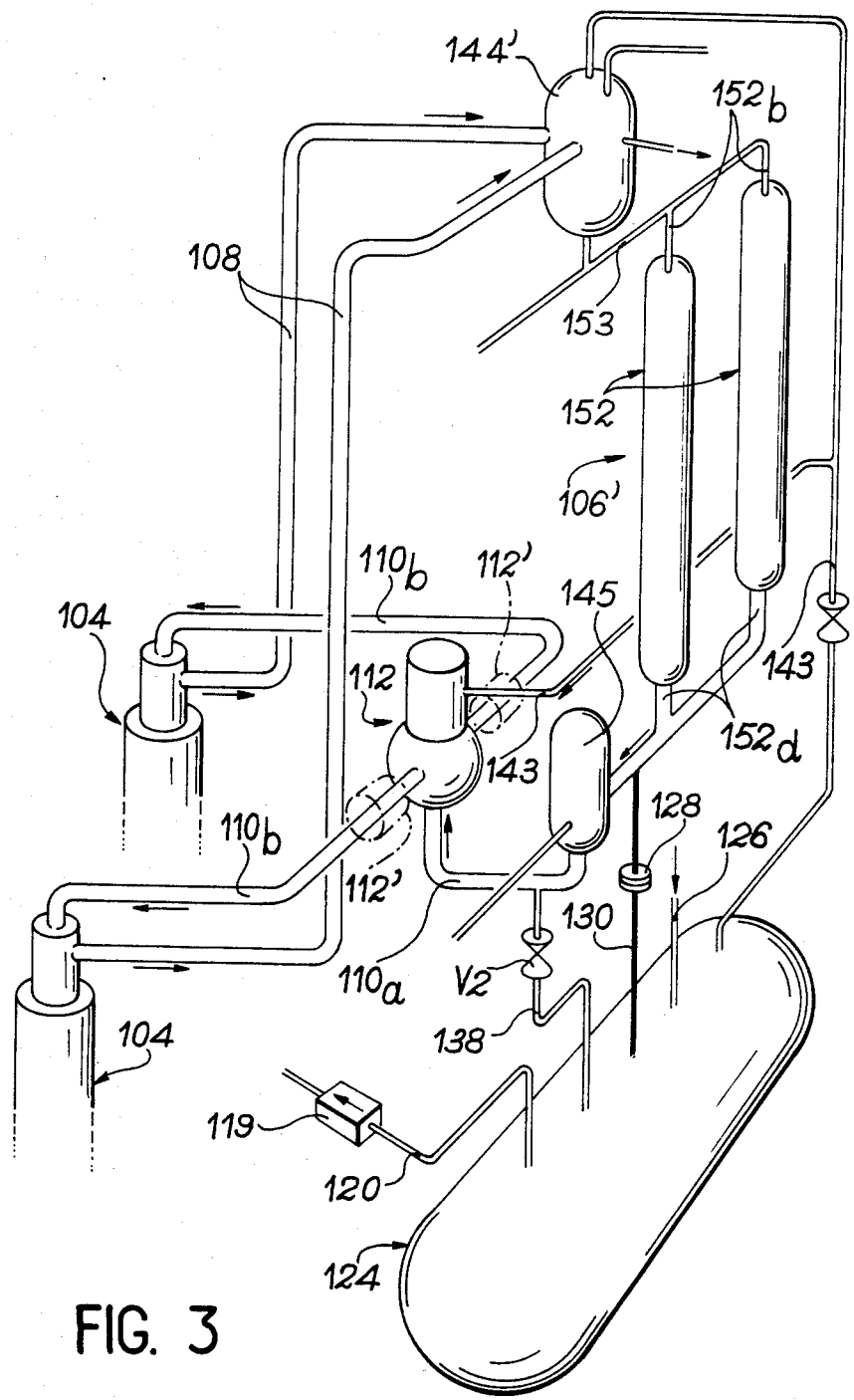
FIG. 3 a variant of the circuit of FIG. 2 showing that the invention can be applied to a circuit having electromagnetic pumps and a modular steam generator.

FIG. 3 shows in a perspective view, a variant of the circuit of FIG. 2, illustrating the case where the steam generator is no longer located in a single envelope and has instead a modular design. It also shows that the mechanical pump can be replaced by one or more pumps of another type and particularly by electromagnetic pumps.

The loop of the secondary circuit shown in FIG. 3 has two exchangers 104 located in the not shown reactor vessel, a steam generator 106'constituted, in the manner shown hereinafter, by a certain number of modules, a pump 112 and outgoing pipe 108 and return pipes 110a, 110b. More specifically, pipes 108 connect the outlet tube of each heat exchanger 104 to a upstream buffer tank 144', which is itself connected by various branches of a relatively short pipe 153 to the inlet tube 152b for the secondary sodium formed at the upper end of each of the exchange modules 152, arranged in parallel in order to define the modular steam generator 106'.

The exchange modules 152 are made in a conventional manner, i.e. they have an outer envelope in which circulates the secondary sodium and exchange tubes disposed within said envelope and in which circulates the water and then the steam of the tertiary circuit.

The secondary sodium outlet tubes 152d formed at the lower end of each of the modules 152 are connected by various branches to part 110a of the return pipe. As in the embodiment of FIG. 2, the downstream buffer tank 145 is placed in part 110a of the return pipe, i.e. between modular generator 106' and pump 112, as close as possible to the steam generator outlet tubes 152d. Thus, according to the invention, there is prevented any formation of large amplitude oscillations in the case of a sodium-water reaction within one or more of the modules of the generator.

As in the preceding embodiment, part 110a of the return pipe is linked with the axial suction tube of mechanical pump 112 and the delivery tubes of the latter are linked by pipes 110b with each of the tubes for introducing secondary sodium into the heads of exchangers 104.

The mixed lines in FIG. 3 illustrate a variant according to which the mechanical pump 112 is replaced by two electromagnetic pumps 112', positioned in each of the return pipes 110b. Obviously, this variant could also apply to the embodiment of FIG. 2, in which the steam generator is compactly constructed within a single envelope.

The constructional variant of FIG. 3 is otherwise identical to that described hereinbefore with reference to FIG. 2, if even certain of the elements of this circuit have not been shown in FIG. 3 in order to facilitate understanding.

However, it is possible to see in FIG. 3 the storage tank 124, drain pipe 138 and its valve V2, as well as pipe 130 equipped with bursting disks 128. It is also possible to see part of pipe 143 connecting the argon covering of tank 124 to the argon covering of the upstream buffer tank 144' and another part of said pipe 143 issuing into the argon covering of pump 112, which is of a mechanical type. FIG. 3 also shows pipe 126 making it possible to control the argon pressure in tank 124, as well as part of pipe 120 connecting tank 124 to pipe 110, and electromagnetic pump 119 ensuring the circulation of sodium in said pipe.

Obviously, the invention is not limited to the embodiments described in exemplified manner hereinbefore and in fact covers all variants thereof.

What is claimed is:

1. In a liquid metal-cooled nuclear reactor having a reactor vessel containing liquid metal and at least one heat exchanger located in said vessel for extracting heat from said liquid metal, a secondary heat transfer circuit, said circuit comprising said heat exchanger and a vertical steam generator outside said vessel, said steam generator having an exchange area therein, an outgoing pipe connecting an outlet tube of said heat exchanger to at least one intake tube of said steam generator, a return pipe connecting at least one outlet tube of said steam generator to an inlet tube of said heat exchanger, said circuit containing a secondary liquid metal, a pump for circulating said secondary liquid metal, said pump being positioned in said return pipe, an upstream buffer tank and a downstream buffer tank disposed in said circuit respectively upstream and downstream of said exchange are of said steam generator, and a storage tank for said secondary liquid metal which can be linked with the remainder of the circuit, wherein said downstream buffer tank is disposed in said return pipe between said steam generator and said circulating pump, in said immediate vicinity of said outlet tube of said steam generator, each of downstream buffer tank, said upstream buffer tank and said storage tank being partially filled with said secondary liquid metal so as to define a free level of said secondary liquid metal therein, and a neutral gas in the space above said free level so as to provide a neutral gas covering, means being provided for establishing a first neutral gas pressure above the free level of said secondary liquid metal contained in said downstream buffer tank and means are also provided for simultaneously establishing a second neutral gas pressure above said free level of said secondary liquid metal contained in said storage tank and in said upstream buffer tank, said second pressure being lower than said first pressure.

2. A circuit according to claim 1, wherein said circulating pump is a mechanical axial suction pump having a pump barrel and a motor controlling the rotation of a rotor in the pump barrel by means of a vertical shaft traversing a hydraulic packing integral with the pump barrel, said secondary liquid metal defining a free level surmounted by a neutral gas covering in that part of said pump barrel positioned above the packing, said neutral gas covering being connected to the neutral gas coverings of said storage tank and said upstream buffer tank.

3. A circuit according to claim 2, wherein it also comprises means for regulating the level of the secondary liquid metal in the pump barrel, said regulating means incorporating a supply pipe connecting said storage tank to the return pipe upstream of said pump, a discharge pipe connecting an overflow formed in the pump barrel above the hydraulic packing to said storage tank, and means for permanently circulating the secondary liquid metal in said supply and discharge pipes, in order to be able to operate with a permanent secondary liquid metal leak through the hydraulic packing of said pump to said storage tank.

4. A circuit according to claim 3, wherein said regulating means are constituted by an electromagnetic pump.

5. A circuit according to claim 1, wherein said circulating pump is an electromagnetic pump.

6. A circuit according to claim 1, wherein said steam generator has a outer envelope in which is located a bundle of exchange tubes defining said exchange area and around which then circulates said secondary liquid metal, the latter being surmounted by a neutral gas covering above said exchange area, in the upper part of said envelope, which consequently constitutes the upstream buffer tank.

7. A circuit according to claim 1, wherein said steam generator has several exchange modules arranged in parallel in order to define said exchange area, said upstream buffer tank being located in said outgoing pipe and is connected directly to the intake tube of said each exchange module.

* * * * *